United States Patent
Rune et al.

(10) Patent No.: US 10,356,641 B2
(45) Date of Patent: Jul. 16, 2019

(54) RADIO LINK REPORTING USING MULTIPLE SYMBOL SEQUENCES

(71) Applicant: Telefonaktiebolaget LM Ericsson (publ), Stockholm (SE)

(72) Inventors: Johan Rune, Lidingö (SE); Andres Reial, Malmö (SE); Henrik Sahlin, Mölnlycke (SE); Icaro L. J. Da Silva, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 186 days.

(21) Appl. No.: 15/128,261

(22) PCT Filed: Jun. 15, 2016

(86) PCT No.: PCT/SE2016/050578
§ 371 (c)(1),
(2) Date: Sep. 22, 2016

(87) PCT Pub. No.: WO2017/217899
PCT Pub. Date: Dec. 21, 2017

(65) Prior Publication Data
US 2017/0366992 A1    Dec. 21, 2017

(51) Int. Cl.
*H04W 24/10* (2009.01)
*H04L 5/00* (2006.01)
(Continued)

(52) U.S. Cl.
CPC ............ *H04W 24/10* (2013.01); *H04B 7/043* (2013.01); *H04B 7/0617* (2013.01);
(Continued)

(58) Field of Classification Search
CPC . H04W 24/08; H04W 24/10; H04W 72/0453; H04W 72/0446; H04W 36/00;
(Continued)

(56) References Cited

U.S. PATENT DOCUMENTS

| | | |
|---|---|---|
| 2013/0059619 A1 | 3/2013 | Kim et al. |
| 2014/0010178 A1 | 1/2014 | Yu et al. |

(Continued)

FOREIGN PATENT DOCUMENTS

| | | |
|---|---|---|
| WO | WO 2015/141066 A1 | 9/2015 |
| WO | WO 2016/198123 A1 | 12/2016 |

OTHER PUBLICATIONS

PCT/SE2016/050578, International Search Report and Written Opinion of the International Searching Authority (EPO), dated Feb. 24, 2017, 16 pages.

(Continued)

*Primary Examiner* — Feben Haile
(74) *Attorney, Agent, or Firm* — Sage Patent Group

(57) ABSTRACT

The present disclosure relates to radio link reporting in mobile communications. More specifically, the proposed technique relates to radio link reporting using multiple reference sequences to represent one selected radio link. The disclosure related to a method for use in a wireless device, for radio link reporting. The method comprises obtaining a radio link reporting model. The radio link reporting model defines how to represent one radio link from a plurality of candidate radio links, using two or more symbol sequences from a set of constituent symbol sequences. The method further comprises determining, based on the radio link reporting model, how to represent a selected radio link, from the plurality of candidate radio links, using two or more of the symbol sequences from the set of constituent symbol sequences, and transmitting the two or more symbol sequences to a network node.

24 Claims, 5 Drawing Sheets

(51) Int. Cl.
| | |
|---|---|
| *H04W 24/08* | (2009.01) |
| *H04W 72/04* | (2009.01) |
| *H04B 7/0426* | (2017.01) |
| *H04B 7/06* | (2006.01) |
| *H04L 25/02* | (2006.01) |
| *H04W 36/00* | (2009.01) |

(52) U.S. Cl.
CPC ......... *H04B 7/0632* (2013.01); *H04B 7/0639* (2013.01); *H04L 5/0016* (2013.01); *H04L 5/0057* (2013.01); *H04L 25/0202* (2013.01); *H04W 24/08* (2013.01); *H04W 36/00* (2013.01); *H04W 72/0446* (2013.01); *H04W 72/0453* (2013.01)

(58) Field of Classification Search
CPC .. H04L 5/0057; H04L 5/0016; H04L 25/0202
See application file for complete search history.

(56) References Cited

U.S. PATENT DOCUMENTS

2016/0337056 A1* 11/2016 Frenne ................ H04B 7/0695
2017/0207909 A1* 7/2017 Whatmough ...... H04B 1/70752
2017/0245259 A1* 8/2017 Islam ................... H04L 5/0048

OTHER PUBLICATIONS

Xin Su, et al "Hierarchical Codebook Design for Massive MIMO," 2013 8th International Conference on Communications and Networking in China (CHINACOM), IEEE 978-1-4799-1406-7, Aug. 14-16, 2013, pp. 178-182.

Samsung, "Discussion on Beam Measurement for 5G New Radio Interface in mmWave Frequency Bands," 3GPP TSG RAN WG2 #94, Nanjing, China, May 23-27, 2016, R2-163652, 4 pages.

* cited by examiner

RADIO LINK REPORTING USING MULTIPLE SYMBOL SEQUENCES

CROSS REFERENCE TO RELATED APPLICATION

This application is a 35 U.S.C. § 371 national stage application of PCT International Application No. PCT/SE2016/050578, filed on Jun. 15, 2016, the disclosure and content of which is incorporated by reference herein in its entirety.

TECHNICAL FIELD

The present disclosure relates to radio link reporting in mobile communications. More specifically, the proposed technique relates to radio link reporting using multiple reference sequences to represent one selected radio link. The disclosure also relates to corresponding devices and to a computer program for executing the proposed methods.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In an UTRAN and an E-UTRAN, a User Equipment, UE, i.e. a wireless device, is wirelessly connected to an access node or Radio Base Station, RBS, commonly referred to as a NodeB, NB, in UMTS, and as an evolved NodeB, eNodeB or eNB, in LTE. A Radio Base Station, RBS, or an access node is a general term for a radio network node capable of transmitting radio signals to a UE and receiving signals transmitted by a UE. In Wireless Local Area Network, WLAN, systems the wireless device is also denoted as a Station, STA.

In the future communication networks, also referred to as the 5th generation mobile networks, there will be evolvement of the current LTE system to the so called 5G system. Due to the scarcity of available spectrum for future mobile, wireless communication systems, spectrum located in very high frequency ranges (compared to the frequencies that have so far been used for wireless communication), such as 10 GHz and above, are planned to be utilized for future mobile communication systems.

For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is frequency dependent, i.e., the link budget would be worse for the same link distance even in a free space scenario, if omnidirectional receive and transmit antennas are used. This motivates the usage of beamforming to compensate for the loss of link budget in high frequency spectrum.

Hence, future communications networks are expected to use advanced antenna systems to a large extent. With such antennas, signals will be transmitted in narrow transmission beams to increase signal strength in some directions, and/or to reduce interference in other directions. The beamforming will enable high data rate transmission coverage also to very distant users which would not realistically be covered with normal sector-wide beams, which have lower antenna gain. Beamforming may be used at the transmitter, at the receiver, or both. In a large part of the spectrum planned for 5G deployments the preferred configuration is to use a large antenna array at the access node and a small number of antennas at the wireless device. The large antenna array at the access node enables high-order transmission beamforming in the downlink.

Whenever handover is performed in such a system, for example from one access node to another, or from one frequency band to another, then a good beam direction at the handover target (i.e. the new access node or the new carrier frequency) towards the wireless device needs to be found in order to sustain high data rate transmission. Furthermore, in systems with very high-gain narrow beamforming, even just performing synchronization or exchanging some initial control signaling messages at the handover target may require selection of a sufficiently good beam direction in order for the access node and the wireless device to hear each other sufficiently well.

Beam reception quality metrics may be e.g. some indication of the received power or Signal to Noise and Interference Ratio, SINR. The reporting may be performed either over the already existing connection (with the serving access node or serving frequency band, e.g. using RRC signaling) or signaling over a radio link using the newly found beam at the handover target.

A proposed way to realize this reporting principle is that the wireless device sends a so called Uplink Synchronization Signal, USS, in the uplink towards the access node from which the selected (e.g. best) beam was received (or possibly to another access node or to multiple monitoring access nodes). The USS can indicate the selected beam by the timeslot in which the USS is transmitted (a typical USS sequence may be 1, 2 or 3 OFDM symbols long). To support this mode of reporting a number of timeslots (e.g. with a length of 1, 2 or 3 OFDM symbols each) have been configured, each mapping towards one of the beams in a so called beam sweep. An alternative way of USS based reporting is that there is only one reporting occasion (e.g. timeslot) (possibly per candidate access node), but the symbol sequence used in the USS indicates the selected beam through a preconfigured mapping between USS sequence and beam (e.g. between USS and measured beam reference signal).

A USS may consist e.g. of a symbol sequence that is similar (or equivalent) to a random access preamble, e.g. a Zadoff-Chu sequence, or some other sequence with good autocorrelation and cross-correlation properties. USS based reporting, especially the alternative with a single reporting occasion and USS sequence to beam mapping, is preferable in many handover situations, because it is fast and transmission resource efficient and works even if the wireless device loses its connection with the old serving access node during the handover preparation (i.e. during the beam sweep).

A beam sweep may consist of a variable number of beams depending on the situation. Often, quite many beams may be required, especially when the candidate beams originate from multiple candidate access nodes. However, when the number of beams in the sweep is substantial also this method runs into problems due to that each beam in a sweep has to be mapped to a unique USS sequence, in order for the wireless device to be able to indicate to the network which beam in the sweep that was perceived as the best. That makes USS sequences a scarce resource and a potential limiting factor for the beam sweep, which in turn may hamper the handover performance.

SUMMARY

An object of the present disclosure is to provide methods, devices configured to execute methods, and computer programs which seek to mitigate, alleviate, or eliminate one or more of the above-identified deficiencies in the art and disadvantages singly or in any combination.

This object is achieved by a method for use in a wireless device, for radio link reporting. The method comprises obtaining a radio link reporting model. The radio link reporting model defines how to represent one radio link from a plurality of candidate radio links, using two or more symbol sequences from a set of constituent symbol sequences. The method further comprises determining, based on the radio link reporting model, how to represent a selected radio link, from the plurality of candidate radio links, using two or more of the symbol sequences from the set of constituent symbol sequences, and transmitting the two or more symbol sequences to a network node. The radio links may be for example downlink beams. The method reduces the need for unique symbol sequences, and thereby enables configuration of symbol sequence based reporting of a large number of radio links, such as reporting a large number of beams of large beam sweeps. The method provides for a reduction of the required number of unique symbol sequences at the expense of somewhat increased resource utilization for the symbol sequence reporting.

According to some aspects, the symbol sequences in the set of constituent symbol sequences have been selected such that the correlation between one symbol sequence in the set, and any other symbol sequence in the set, is below a threshold. The reduction of the number of needed unique symbol sequences also allows selection of symbol sequences of higher quality in terms of autocorrelation and cross-correlation properties, since sequences with good such properties are a limited resource.

According to some aspects, the number of symbol sequences in the set of constituent symbol sequences is less than the number of candidate radio links. Reducing the number of symbol sequences is advantageous, as the number of symbol sequences that can fulfil required correlation properties is limited. For a large beam sweep the available symbol sequences may not be enough when using one unique symbol sequence to represent each beam, and the network would have to limit the number of beams it would like to try, which means that the beam sweep result may be suboptimal and may even fail completely.

Even in cases where the available symbol sequences would be enough, if you can do with fewer sequences, the risk for incorrect detection, i.e. that the network receives symbol sequence X, but erroneously interprets it as symbol sequences Y, is reduced. The fewer different symbol sequences the network has to be prepared to receive (i.e. the fewer decoding hypotheses it has to try), the smaller is the risk of erroneous detection. Hence, if fewer symbol sequences can be used, it may be that they can be selected in a manner that minimizes miss-detection.

Furthermore, if fewer symbol sequences are used, then symbol sequences with smaller bandwidth could be used, which in itself could be seen as "improved quality", because it is more resource efficient.

According to some aspects, the obtaining comprises receiving information defining the radio link reporting model from the network node. In some scenarios the sizes of the messages used for beam sweep configuration may also be reduced. This is the case if the beam reference signal to symbol sequence mapping is part of the configuration of the wireless device for the sweep (which is assumed to be the typical and preferred procedure).

According to some aspects, the obtaining comprises reading information defining the radio link reporting model stored in the wireless device. By hardcoding the radio link reporting model in the wireless device, no extra signaling is required.

According to some aspects, the determining comprises determining two or more symbol sequences, from the set of constituent symbol sequences, to be transmitted. According to some aspects, the determining comprises determining time, frequency and/or code resources to be used for the transmission of the two or more symbol sequences.

According to some aspects, the transmitting comprises transmitting the two or more symbol sequence separately in time, in frequency, or in the code domain. Hence, transmitting two symbol sequences does not necessarily add a delay to the reporting as the symbol sequences might be transmitted in parallel using different resources.

According to some aspects, one of the two or more symbol sequences defines a group of candidate radio links and the second an identity of a candidate radio link within the group.

According to some aspects the disclosure proposes a method for use in a network node, for receiving radio link reporting associated with a plurality of candidate radio links. The method comprises obtaining a radio link reporting model defining how to identify one radio link, from a plurality of candidate radio links, using two or more symbol sequences from a set of constituent symbol sequences, receiving two or more of the symbol sequences from a set of constituent symbol sequences, the two or more symbol sequences together identifying a selected radio link, and identifying the selected radio link based on the received two or more symbol sequences and the obtained radio link reporting model.

According to some aspects the disclosure proposes a wireless device being configured for radio link reporting, the wireless device comprises communication interface and processing circuitry. The processing circuitry is configured to cause the wireless device to obtain a radio link reporting model, the radio link reporting model defining how to represent one radio link from a plurality of candidate radio links, using two or more symbol sequences from a set of constituent symbol sequences. The processing circuitry is configured to cause the wireless device to determine, based on the radio link reporting model, how to represent a selected radio link, from the plurality of candidate radio links, using two or more of the symbol sequences from the set of constituent symbol sequences, and to transmit the two or more symbol sequences to a network node.

According to some aspects the disclosure proposes a network node in a cellular communication network configured for receiving radio link reporting associated with a plurality of candidate radio links. The network node comprises a communication interface and processing circuitry. The processing circuitry is configured to cause the network node to obtain a radio link reporting model defining how to identify one radio link, from a plurality of candidate radio links, using two or more symbol sequences from a set of constituent symbol sequences, to receive two or more of the symbol sequences from a set of constituent symbol sequences, the two or more symbol sequences together identifying a selected radio link, and to identify the selected radio link based on the received two or more symbol sequences and the obtained radio link reporting model.

According to some aspects, the disclosure relates to a computer program comprising computer program code which, when executed, causes a wireless device or network node to execute the methods described above and below. According to some aspects the disclosure pertains to a computer program product or a computer readable medium holding said computer program.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
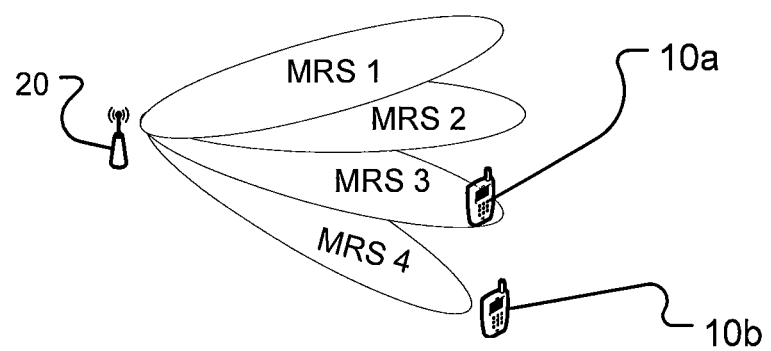
FIG. 1 illustrates a beam sweep transmitted from a network node 20 having one transmission point.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

For better understanding of the proposed technique a short introduction to beam sweeping procedures foreseen to be used in the next generation communication systems will now be given.

In order for the initial-access procedure not to be the coverage-limiting factor in the next generation of communication systems, the reference signals used for synchronization and mobility will typically also have to use high-gain narrow beams. This means that the access node will typically have to transmit the signals multiple times, in different directions, to cover the geographical area to be served by an access node, access node. With typical antenna configurations envisioned for the next generation communication systems, sometimes referred to as 5G systems, a narrow beam may cover only a small fraction of the entire geographical area (e.g. 1%) at a time, and consequently it may take substantial time to transmit the beam in all directions needed, one or a few directions at a time.

The access node could in principle, depending on hardware configuration, transmit the reference signals in many directions at the same time, but given a maximum total output power of the access node, such simultaneous transmission would be at the expense of proportionally reduced power per beam, i.e. effectively reduce the coverage. This could be compensated for by over-dimensioning the hardware such that excessive total output power is available, but this would undesirably increase the cost of the equipment. The procedure of sequentially transmitting the beam in all necessary directions is referred to as a beam sweep or beam scan. "Necessary directions" here means all directions where coverage is desired. FIG. 1 illustrates a beam sweep transmitted from a network node 20 having one transmission point.

Such a beam sweeping procedure with the purpose of synchronization and beam finding may be performed both for initial access (as described above) and in conjunction with handover of a wireless device from one beam to another. Note that a handover preparation procedure involving beam sweeping may involve activated candidate target beams from the wireless device's current serving access node and/or one or more other candidate target access nodes. In 5G systems it is also expected that one single access node might have several transmission points.

The wireless device may hear any of the many transmissions of the reference signal during the beam sweep, and the network will not know which one the wireless device heard. This means that if the wireless device is supposed to send a system access request, e.g. using PRACH, a certain time after hearing a synchronization beam transmission, which is a typical random access request procedure, then the network has to listen for an uplink signal at multiple time instances in a given direction, and/or the wireless device has to transmit its uplink signal at multiple time instances.

The beam sweep may serve other purposes than just time and frequency synchronization; in particular, the sweep may also serve the purpose of determining the best beam direction for data transmission to the new wireless device. In such cases, the beam may contain some information that uniquely identifies the synchronization beam, so that the wireless device can report to the access node, which beam that was best received. Such a reference signal is in 5G sometimes referred to as a Mobility Reference Signal, MRS or Beam Reference Signal, BRS. In this disclosure the term link quality measurement signal is used to indicate a signal serving the purpose of providing a reference signal for estimating the quality of a radio link such as a beam, sector or cell.

Typically, a wireless device has been configured with the information it needs to determine the sequence number of a beam it wants to report, e.g. the best beam. This information may be e.g. the order in which the beams will be transmitted (in this case each beam would have a different Beam Reference Signals, BRS) or it may be information about in which timeslots (or time windows) the beams will be transmitted in the sweep (e.g. "the N beams will be transmitted in timeslots T, T+1, . . . T+N−1) (in this case no BRS is needed). In the former example the wireless device could map the BRS to a sequence number (i.e. beam number 5 in the sweep); in the latter example the wireless device could map the timeslot where it received the beam to a sequence number (e.g. beam received in timeslot T+4 that means it is beam number 5 in the sweep).

Here, the best beam can be characterized by several alternative measures, for example the one received with highest power, largest signal to noise ratio, smallest time of arrival (indicating closest access node) or first received power over a threshold. This can be seen as a sort of spatial synchronization. For simplicity, we will henceforth collectively refer to signals for time and frequency synchronization as well as beam identification as just synchronization signals, which comprise synchronization sequences.

Uplink Synchronization Signal, USS, will herein be used as an example, for further describing a typical scenario where the proposed technique is implemented. However, it must be noticed that similar situations occurs for other symbol sequences (also referred to as signature sequences or reference sequences) having similar signal properties such as small variation in time (good power amplification properties), small variation in frequency (channel estimation at receiver will be simple), good auto correlation properties and low cross correlation property (small inter sequence interference). Such sequences are e.g. described in B. M. Popovic, "Generalized chirp-like polyphase sequences with optimum correlation properties, " IEEE Trans. Inform. Theory, vol. IT-38, no. 4, pp. 1406-1409, July 1992.

A beam sweep may consist of a variable number of beams depending on the situation. Often, quite many beams may be required, especially when the candidate (downlink) beams originate from multiple candidate access nodes. In high frequency bands, where narrow beams may be required, the beams in a sweep may add up to a substantial number, especially when the wireless device's location is only vaguely known, e.g. when handing over a wireless device from a low to a high frequency band (and in general, in a handover situation between two downlink beams, which target downlink beam to activate may be quite uncertain). However, beam sweeps consisting of large numbers of beams are problematic in conjunction with symbol sequence reporting, such as USS based beam sweep measurement reporting.

For example, the USS based beam sweep measurement reporting method that relies on the timeslot of the USS transmission to indicate the selected beam becomes undesirably wasteful, because the candidate access nodes have to reserve a substantial number of uplink timeslots for monitoring the allocated USS transmission timeslots. In addition, since the wireless device may have to skip a number of timeslots while waiting for the right one to transmit in (i.e. the timeslot that corresponds to the beam that the wireless device is to report/indicate), the entire procedure may be prolonged and this may be emphasized because the access node may have to insert gaps in the timeslot sequence, due to other obligations, e.g. switching to downlink Time Division Duplex, TDD, operation. Note that an access node using TDD cannot transmit anything in the downlink while listening for uplink transmissions (and TDD is assumed to be the dominating operating mode for 5G).

In light of the above problems of relying on timeslots for beam indication in symbol sequence reporting, such as USS based reporting, the alternative symbol sequence based reporting using the symbol sequence to indicate the beam, such as the USS based reporting method using the USS sequence to indicate the beam, seems preferable. However, also this method runs into problems when the number of beams in the sweep is substantial. The problem stems from the fact that each beam in a sweep has to be mapped to a unique USS sequence in order for the wireless device to be able to indicate to the network, which beam in the sweep was perceived as the best. Unique here also implies that the USS sequences needs to be "orthogonal" (or at least almost orthogonal, such that the network node can differentiate a received USS sequence from any other USS sequence. Additionally, the USS may need to encode the identity of the reporting wireless device (e.g. through dedicated USS signal sequences temporarily allocated to the wireless device for the beam sweep). However, the practically feasible space of potential USS signal sequences with sufficiently good autocorrelation and cross-correlation properties is limited, not least due to the fact that sequence modulation detection is based on testing the entire hypothesis set. That makes USS signal sequences a scarce resource and a potential limiting factor for the beam sweep, which in turn may hamper the handover performance.

Figure 2:
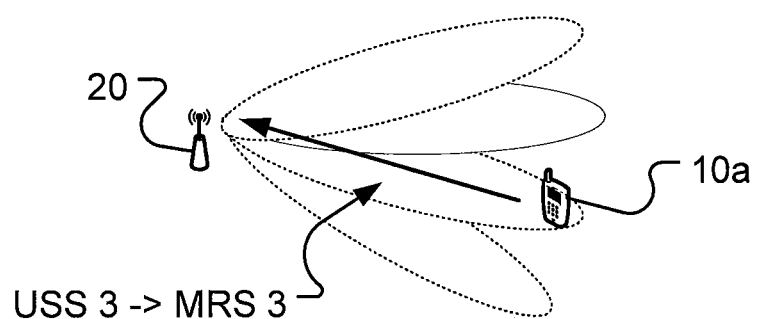
FIG. 2 illustrates a wireless device reporting one beam of the beam sweep of FIG. 1.

FIG. 2 illustrates a wireless device reporting one beam of the beam sweep of FIG. 1, using a USS sequence (here USS 4) representing the "best" beam, which in this example is the beam corresponding to MRS 3. The proposed technique addresses the USS sequence space size limitation problem in the above described USS based beam sweep measurement reporting method where the reported USS sequence maps to the best detected beam (which as described above is preferable to the timeslot based reporting method).

When the USS sequence is used to indicate a certain beam in a beam sweep, the conventional USS sequence represents a certain set of bits, which identifies (maps to) the concerned beam. For instance, to be able to indicate one beam out of a sweep consisting of 256 beams, 8 bits are required (and 256 unique USS sequences are required to be able to indicate all 256 combinations of the 8 bits).

The proposed technique addresses the USS sequence space size limitation problem of the USS based beam sweep measurement reporting method where the reported USS sequence maps to the best detected beam (which as described above is preferable to the timeslot based reporting method). To reduce the number of unique USS sequences that are required to represent the set of beams, the disclosure proposes using multiple USS sequences to represent one beam, or more generally put, to use multiple symbol sequences to represent one radio links.

When the USS sequence is used to indicate a certain beam in a beam sweep, the conventional USS sequence represents a certain set of bits, which identifies (maps to) the concerned beam. For instance, to be able to indicate one beam out of a sweep consisting of 256 beams, 8 bits are required (and 256 unique USS sequences are required to be able to indicate all 256 combinations of the 8 bits).

According to some aspects of the proposed technique, the set of bits required to represent all beams in a set (e.g. 8 bits if 256 beams) is divided into two or more subsets of bits (e.g. 8/2=4 bits), where each subset of bits is represented (and reported) by a separate USS sequence. For example, two USS sequence transmissions could thus be used to report two subsets of the bits and the required unique USS sequence set would be reduced from 256 to 16 (i.e. $2^4$).

That means that if the beam sweep consists of N beams, traditionally N symbol sequences would be used to being able to identify any one of the beams. However, using the proposed technique it is actually possible to represent the N beams using much fewer symbol sequences. The concept will now be described using an illustrating example.

If a beam sweep consists of N beams, then information representing 2log(N) information bits, are needed to uniquely identify one of the beams. For example, if N=256, represents information equivalent to 8 bits. A very simple way is to just give each beam in the sweep a sequence number, e.g. 0-(N-1).

In this example the symbol sequence in fact represents a bit sequence, e.g. to indicate that beam number 5 was the best, the wireless device sends the USS that has been configured to map to beam number 5, which then could be seen as representing the bit sequence (o set of bits) 00000101.

The idea is to represent this bit sequence by two or more symbol sequences instead of by one. One way is to divide the bit sequence into two (or more) parts and then use one sequence to represent each part.

Hence, this disclosure proposes to abandon the strict beam-symbol sequence mapping and instead step up one level of abstraction and let a symbol sequence simply represent one part of a beam identifier such as a bit sequence or a group identifier.

Example Operations

The proposed methods will now be described in more detail referring to FIGS. 3 and 4. It should be appreciated that FIGS. 3 and 4 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed. The example operations may be performed in any order and in any combination.

Figure 3:
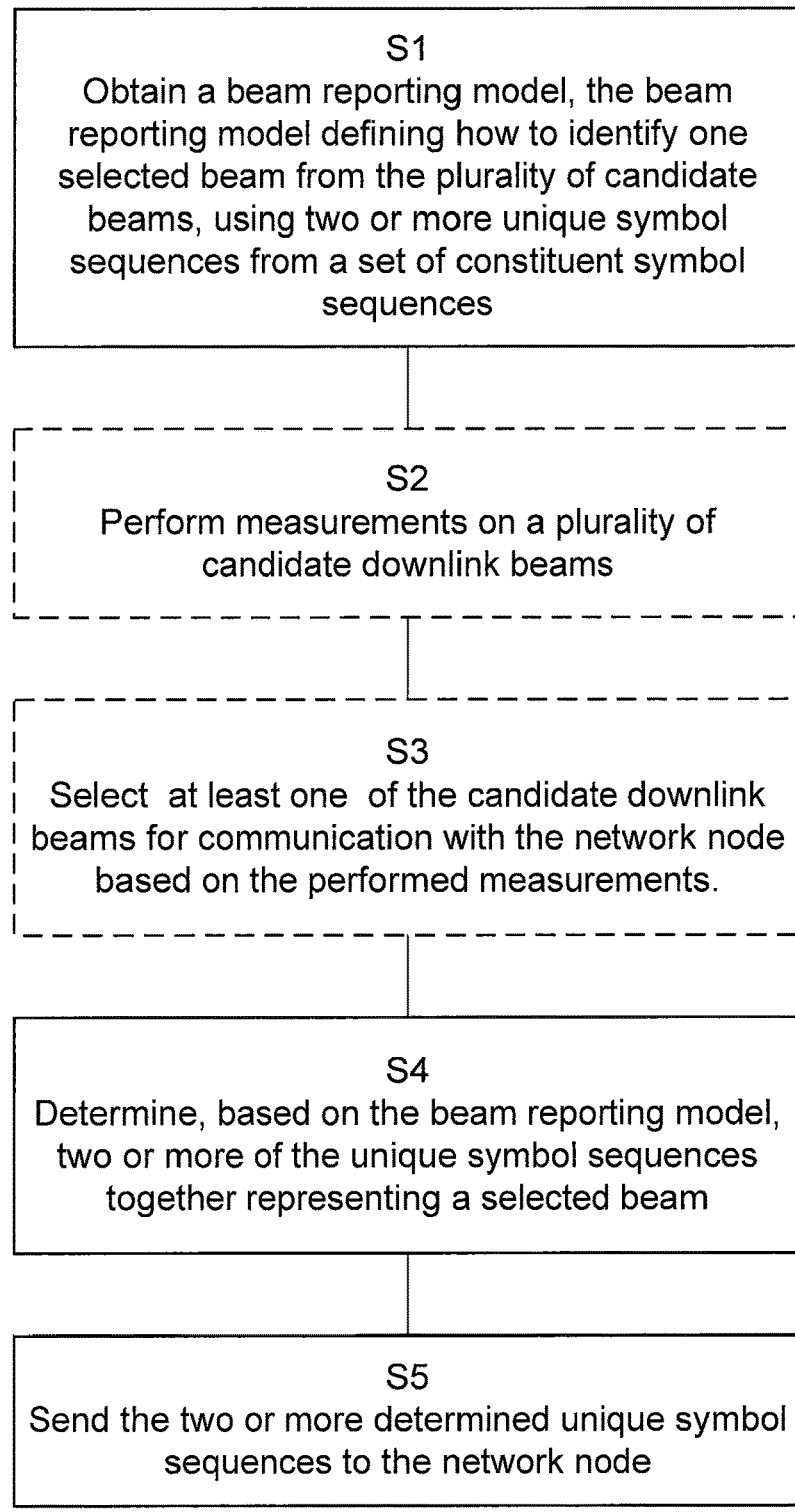
FIG. 3 is a flowchart illustrating method steps performed in a wireless device according to the proposed technique.
Figure 4:
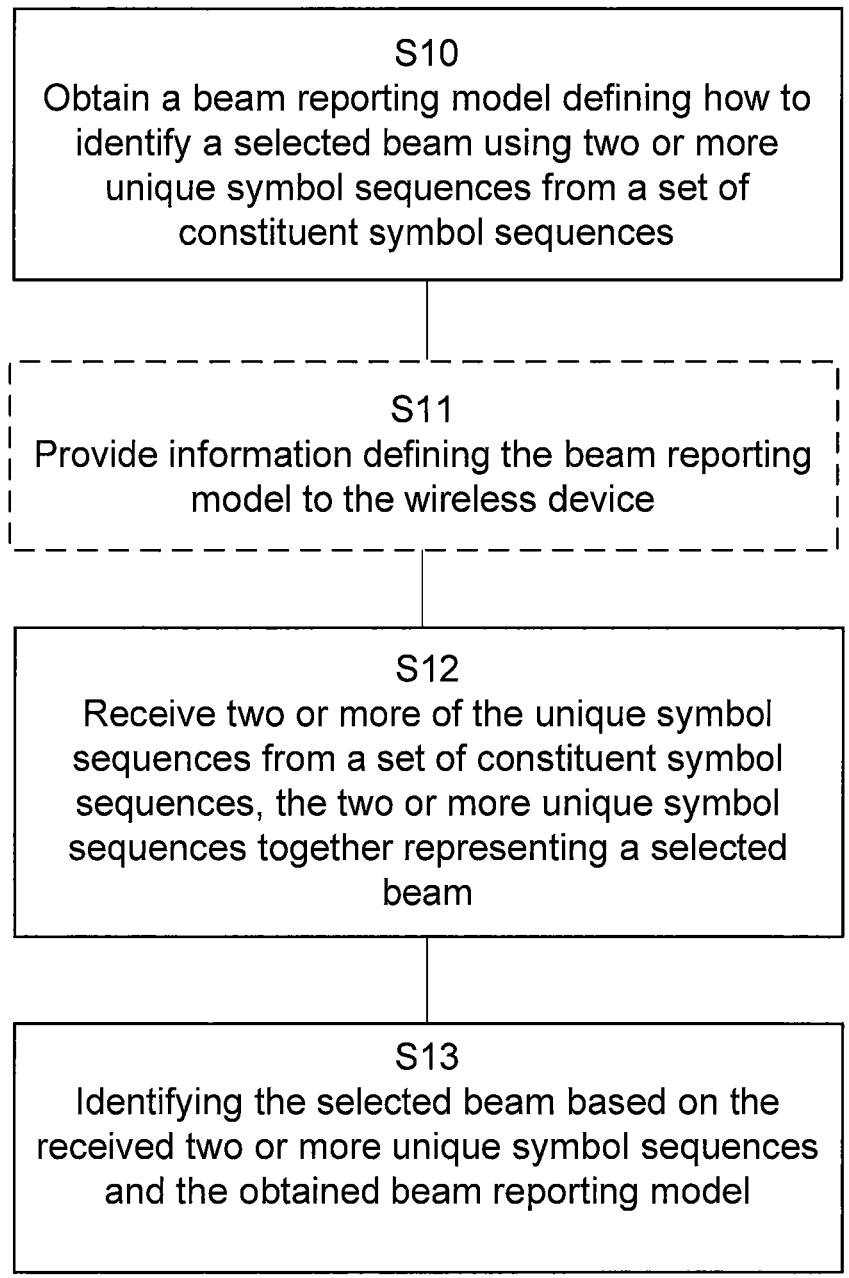
FIG. 4 is a flowchart illustrating method steps performed in a network node according to the proposed technique.

FIG. 3 illustrates a method, performed in a wireless device, for radio link reporting of downlink radio links. A radio link is e.g. a radio link associated with a beam, sector, cell, transmission point etc. The method is performed at any time, when a network node, for example in connection with a beam sweep, is about to perform radio link reporting to a network node. A typical scenario is that a wireless device in connection with a beam sweep wants to report one or several preferred serving beams to a network node. Stated differently, according to some aspects, the radio link reporting is based on measurements performed on link quality measurement signals transmitted by a network node in the candidate radio links. The link quality measurement signals may be e.g. reference signals.

The method comprises obtaining S1 a radio link reporting model. The radio link reporting model or configuration defines how to represent one radio link from a plurality of candidate radio links, using two or more symbol sequences from a set of constituent symbol sequences.

Symbol sequences here refer to detectable signals, having good autocorrelation and cross-correlation properties. Hence, a symbol sequence cannot really be seen as a piece of data in the form of bits, but is rather a signal having certain properties. The symbol sequence can be used to "encode" (or identify) something (e.g. a radio link) by mapping a symbol sequence to a certain "something" (e.g. a selected radio link). One example of a symbol sequence is the Uplink Synchronisation Sequence, USS, described above, which represents a selected beam. However, unique symbol sequences are not crucial. An alternative is letting the time and/or frequency of the symbol sequences transmission serve as a means to identify something (instead of the symbol sequences itself).

The symbol sequences are picked out of a set of sequences with the special properties of being "almost orthogonal", which implies that a receiving network node can detect one of the symbol sequences and with a certain probability determine which symbol sequence it has detected. Hence, a set of constituent symbol sequences here refers to a set of one or more unique symbol sequences. Hence, all the symbol sequences within the set are unique with respect to one another.

By splitting the information representing one radio link into two or more parts and representing each part by one symbol sequence, fewer unique symbol sequences are needed as will be apparent from the examples below. Hence, according to some aspects, the number of symbol sequences in the set of constituent symbol sequences is less than the number of candidate radio links.

According to some aspects, the symbol sequences in the set of constituent symbol sequences have been selected such that the correlation between one symbol sequence in the set and any other symbol sequence in the set, is below a threshold. The threshold may be determined as an expectation of correlation of a synchronization sequence with a random sequence with unit-power, multiplied by a design-specific constant. In other words, any inter-sequence correlation should not look much different from a noise-induced ("nothing there") correlation result. In other words the symbol sequences are constructed for high probability of detection, which is the case when the cross-correlation between the symbol sequences is below a threshold. The symbol sequences within the set typically all have the same length and the correlation properties are typically only valid when transmitting the entire symbol sequences.

In practice, the set could comprise only one symbol sequence. Then the radio link is represented by the way the symbol sequence is transmitted in terms of e.g. time, frequency and/or code resources used for the transmission.

Traditionally, when used to report the result of a beam sweep measurement, one symbol sequence is picked to map to each beam in the sweep. However, the proposed technique proposes picking two or more symbol sequences to map to each beam in the sweep. The radio link reporting model defines a mapping between the beams in the sweep and two or more symbol sequences including possibly also "how" they are transmitted.

In other words, the radio link reporting model describes how two interpret information provided by transmission of two or more symbol sequences, in terms of which time, frequencies and/or code resources are used for the transmission and/or in terms of which symbol sequences are transmitted. In other words, the radio link reporting model defines how to represent one radio link using two or more such sequences. Note that the two or more symbol sequences representing one radio link could be the same symbol sequence transmitted twice.

The radio link reporting model is either provided autonomously by the wireless device or signaled to the wireless device from the network node. Signaling could be done more seldom such as at connection setup or in connection with e.g. a beam sweep. Stated differently, according to some aspects, the obtaining S1 comprises receiving information defining the radio link reporting model from the network node.

The radio link reporting model could also be hardcoded or pre-stored in the wireless device. Stated differently, according to some aspects, the obtaining S1 comprises reading information defining the radio link reporting model stored in the wireless device.

Back to FIG. 3, the proposed technique refers to radio link reporting. Typically, radio link reports are based on measurements performed by the wireless device. Hence, according to some aspects the method comprises performing measurements S2 on the plurality of candidate radio links, and selecting S3 from the candidate radio links, based on the performed measurements, at least one by the wireless device preferred radio link for communication with the network. The best radio link is e.g. the radio link having the best channel properties. The selected radio link then needs to be reported to the network. The same principle is of course applicable for reporting any radio link.

In order to report the radio link, the wireless device needs to find out which symbol sequences should be sent and which resources should be used for sending those symbol sequences, in order to enable a receiving network node to identify the link. This could be done using the radio link reporting model. Stated differently, the method further comprises determining S4, based on the radio link reporting model, how to represent (or identify) a selected radio link, from the plurality of candidate radio links, using two or more of the symbol sequences from the set of constituent symbol sequences.

According to some aspects, the determining S4 comprises determining two or more symbol sequences, from the set of constituent symbol sequences, to be transmitted S5. Hence, one possibility is to let the combination of sequences identify the radio link.

According to some aspects, the determining S4 comprises determining time, frequency and/or code resources to be used for the transmission S5 of the two or more symbol sequences. This means that one combination of symbol sequences could represent different radio links depending on which resources are used for the transmission.

One way of implementing this is to let one of the two or more symbol sequences define a group of candidate radio links and to let the second symbol sequence represent an identity of a candidate radio link within the group. This will now be described using a beam sweep as an example. The (reference) sequences and the resources could also be used in combination to identify the radio link.

In this example, the beams to be used in the sweep are divided into groups, where a certain order of the beams is defined within each group. Groups are typically defined in the configuration of the wireless device (and access nodes), which is e.g. provided in the beam reporting model. A set of symbol sequences are mapped to the beam groups (e.g. one sequence representing one group) and the same set of symbol sequences are reused and mapped also to the beams in a group (or more specifically the beams' order numbers within a group, e.g. one sequence representing the beam's order within the group). For instance, in an example with 256 beams in a sweep, these beams may be divided into 16 groups containing 16 beams each. The set of symbol sequences to be used for reporting then contains 16 symbol sequences. Assume that the wireless device finds that beam number 7 in the 3rd group is the best. The wireless device then transmits two symbol sequences: one mapping to the 3rd group of beams and a second one (in another timeslot or on other frequencies, e.g. subcarriers) that maps to "intra-group order number" 7. The beam group principle for dividing the bits to be reported into subsets could be extended to multiple group hierarchies.

A way to use non-equally sized subsets could be to leverage that the fewer possible symbol sequences the receiving access node has to be prepared to receive, the smaller is the risk of incorrect decoding, i.e. that the receiver believes that a received symbol sequence was sequence X when it was actually sequence Y. This is because for a given symbol sequence length, encoding a smaller number of possible symbol sequences effectively allows increasing a relevant (e.g. Euclidean or Hamming) minimum distance metric, thus making detection more robust. This property can be utilized to report a coarse beam direction more robustly than the fine directional resolution. As an example, consider a case where the beam group principle for dividing the bits to be reported into subsets is applied to a beam sweep consisting of 256 beams. These beams could then be divided into 8 groups of 32 beams each. 8 unique symbol sequences would then have to be allocated for the symbol transmission that reports the beam group and 32 (i.e. an additional 24) unique symbol sequences would have to be allocated for reporting of the intra-group order number. The reporting of the beam group would thus be more robust than the reporting of the intra-group order number. To make this beneficial, the beams in each group should be adjacent (or partly overlapping), so that combining them effectively forms a wider beam (e.g. roughly cone-shaped). Then, even if the intra-group order number reporting fails, the beam group report is enough for the receiving access node to derive a wide beam that suits the wireless device.

Once the wireless device has determined how to represent a selected radio link, from the plurality of candidate radio links, using two or more of the symbol sequences from the set of constituent symbol sequences, the wireless device transmits S5 the two or more symbol sequences to a network node. The two or more symbol sequences are transmitted according to the determination in step S4. The radio link reporting thus involves transmitting symbol sequences representing, indicating or identifying the radio link to the network node.

Instructions for how to report the bits should be included in the beam reporting model for the beam sweep that the wireless device receives. This should include information about how the bits to be reported are divided into subsets, the mapping symbol sequences and the timeslots and/or frequencies to use for the reporting. Parts or all of this configuration data could be obtained from the network, e.g. the serving access node (as dedicated signalling and/or broadcast system information), or from data stored on the USIM or hardcoding based on standard specifications.

Hence, dividing the bits to be reported into two equally-sized subsets effectively reduces the required number of unique symbol sequences to the square root, i.e. $N_{subset} = \sqrt{N_{full}}$ where $N_{full}$ is the number of unique symbol sequences required when all the bits to be reported are reported in a single symbol sequence transmission and $N_{subset}$ is the number of unique symbol sequences needed to report the two equally-sized subsets of bits.

Similarly, dividing the bits to be reported into three equally-sized subsets (e.g. 9 bits divided into three subsets of 3 bits each) results in a reduction of the required number of unique symbol sequences to the cube root, i.e.

$$N_{subset} = \sqrt[3]{N_{full}}.$$

In general, dividing the set of bits to be reported into m equally-sized subsets reduces the required number of unique symbol sequences to the $m^{th}$ root, i.e.

$$N_{subset} = \sqrt[m]{N_{full}}.$$

The bits to be reported may of course also be divided into subsets of non-equal sizes, e.g. dividing 8 bits to be reported into three subsets of 3, 3 and 2 bits respectively.

At transmission the two or more symbol sequences could be separated in time, frequency or in the code domain. Separation in time involves e.g. using several different (e.g. consecutive) timeslots (e.g. with a length of 1, 2 or 3 OFDM symbols each, matching the length—in number of OFDM symbols—that is being used for a symbol sequence). Separation in frequency involves e.g. using different subcarrier groups. Separation in the code domain involves e.g. using several (near-) orthogonal symbol sequences superimposed in the same resource elements in time and frequency.

A corresponding method, performed in a network node in a wireless communication network for receiving radio link reporting associated with a plurality of candidate radio links, will now be described referring to FIG. 4. The method is performed either at connection setup or when a wireless device is already connected to the network node. The network node is e.g. an access node. The method is e.g. performed in connection with a beam sweep, when the network node has transmitted link quality measurement signal (e.g. reference signals) on a plurality of candidate radio links (e.g. beams). Hence, aaccording to some aspects, the reporting is based on measurements performed on link quality measurement signals transmitted by a network node in the candidate radio links.

The proposed method requires that the network node and the reporting wireless device hold a common model for radio link reporting. This model defines the reporting as discussed above. Hence, the method performed in a network node comprises obtaining S10 a radio link reporting model defining how to identify one radio link, from a plurality of candidate radio links, using two or more symbol sequences from a set of constituent symbol sequences. The beam reporting model could be static e.g. defined by standardisation or it could be dynamically determined e.g. in the network.

If the beam reporting model is controlled by the network, the method according to some aspects comprises providing S11 information defining the radio link reporting model to the reporting wireless device. In other words, the network provides the model that should be used for beam reporting (which is e.g. stored in the network node or in another network node) to the wireless device. This would typically be done at system setup, or in connection with a beam sweep. In any case, it must be performed before the reporting described in connection with FIG. 3 is performed.

The symbol sequences have already been defined in connection with the method in a wireless device above. Hence, according to some aspects, the symbol sequences in the set of constituent symbol sequences have been selected such that the correlation between one symbol sequence in the set and any other symbol sequence in the set, is below a threshold. Furthermore, according to some aspects, the number of symbol sequences in the set of constituent symbol sequences is less than the number of candidate radio links.

The network node then receives radio link reporting according to the "agreed" reporting model from a wireless device, as already described in connection with FIG. 3. Stated differently, the method comprises receiving S12 two or more of the symbol sequences from a set of constituent symbol sequences, the two or more symbol sequences together identifying (or representing) a selected radio link. In other words, by knowing which symbol sequences that were transmitted and "how" they were transmitted, the network node can figure out which radio link the wireless device wants to report. Hence, the symbol sequence carries the identification information. According to some aspects, the receiving S12 comprises receiving the two or more symbol sequences separately in time, in frequency, or in the code domain. This means that two symbol sequences may be transmitted simultaneously.

The beam reporting model comprises information needed to interpret the information carried by the two or more of the symbol sequences. Hence, the method further comprises identifying S13 the selected radio link based on the received two or more symbol sequences and the obtained radio link reporting model. For example, the radio link reporting model defines how to combine the symbol sequences to identify the selected radio link.

As discussed above the radio link could be represented by the symbols sequences as such. Hence, according to some aspects, the identifying S13 comprises identifying the selected radio link based on which symbol sequences, from the set of constituent symbol sequences, are received.

The proposed solution eases the processing burden on the access node by reducing the number of decoding hypotheses at symbol sequence reception. When the number of possible symbol sequences the access has to try to decode is drastically reduced, so is the access node's processing burden. It is significantly less compute intensive to detect two N/2-bit symbol sequences than one N-bit symbol sequence.

The radio link could also be represented by "how" the symbol sequences are transmitted. Hence according to some aspects, the identifying S13 comprises identifying the selected radio link based on which time, frequency and/or code resources are used for receiving the symbol sequences.

As discussed above, according to some aspects, one of the two or more symbol sequences defines a group of candidate radio links and the second an identity of a candidate radio link within the group.

Example Implementation Using Uplink Synchronization Signals

The proposed technique will now be described using a detailed implementation using multiple USS to represent one beam in a beam sweep.

When a single USS sequence must be used to indicate a certain beam in a beam sweep, the USS sequence must carry all bits that identify (map to) the concerned beam. For instance, to be able to indicate one beam out of a sweep consisting of 256 beams, 8 bits are required and 256 unique USS sequences are required to be able to indicate all 256 combinations of the 8 bits. An example of such a mapping is illustrated in Table 1 for a sweep consisting of 16 beams (each with its own Mobility Reference Signal, MRS) mapping to 16 USSs. It is assumed that each downlink and each USS is associated with an index (similar to random access preamble indexes in LTE), which is indicated as a subscript suffix (e.g. MRSx, USSy) in the table. The MRS to index mapping and the USS to index mapping should preferable be standardized (and thus hardcoded in the wireless device), but could also be conveyed to the wireless device through other means, e.g. included in system information or stored in the USIM.

TABLE 1

An example of 16 beam/MRS to USS mappings, each of which conceptually corresponds to a 4-bit number.

| MRS | 4-bit number | USS |
|---|---|---|
| $MRS_3$ | 0000 | $USS_5$ |
| $MRS_4$ | 0001 | $USS_8$ |
| $MRS_5$ | 0010 | $USS_9$ |
| $MRS_7$ | 0011 | $USS_{10}$ |
| $MRS_9$ | 0100 | $USS_{11}$ |
| $MRS_{13}$ | 0101 | $USS_{15}$ |
| $MRS_{14}$ | 0110 | $USS_{21}$ |
| $MRS_{19}$ | 0111 | $USS_{22}$ |
| $MRS_{20}$ | 1000 | $USS_{23}$ |
| $MRS_{21}$ | 1001 | $USS_{25}$ |
| $MRS_{24}$ | 1010 | $USS_{26}$ |
| $MRS_{27}$ | 1011 | $USS_{29}$ |
| $MRS_{29}$ | 1100 | $USS_{31}$ |
| $MRS_{30}$ | 1101 | $USS_{32}$ |
| $MRS_{31}$ | 1110 | $USS_{33}$ |
| $MRS_{32}$ | 1111 | $USS_{35}$ |

Note that the 4-bit numbers in the middle column are not needed, e.g. for configuring the wireless device for a beam sweep, but are included in the table merely for explanatory purpose.

To reduce the number of unique USS sequences that are required to represent the set of bits, we divide the set of bits into two or more subsets, where each subset of bits is reported by a separate USS sequence. Referring back to FIG. 3, in the wireless device this implies that the determining S4 comprises dividing S4a a set of bits representing the selected radio link into two or more bit combinations together identifying (or indicating) the selected radio link and thereafter mapping S4b each of the two or more bit combinations, together identifying the selected radio link, to a symbol sequence from a set of constituent symbol sequences.

With the example where 8 bits are required to uniquely indicate a beam in the sweep, these 8 bits could for instance be divided into two subsets with 4 bits in each subset. The required unique USS sequence set has thus been reduced from 256 to 16 (i.e. $2^4$) USS sequences. Two USS sequence transmissions would thus be used to report the two subsets of the 8 bits in the above example. These two USS transmissions could be separated in time, i.e. two different (e.g. consecutive) timeslots (e.g. 1, 2 or 3 OFDM symbols each, depending on the length of a USS sequence), in frequency, e.g. on different subcarriers, or in the code domain (by superimposing two orthogonal USS sequences in same time/frequency resources).

The number of subsets the bits are divided into and thus the number of USS transmissions per reporting occasion may be adaptive depending on the size of candidate beam set (i.e. the number of beams in the sweep) in the current measurement session.

By letting the receiving network node, concatenate bit combinations represented by symbol sequences, one can put together longer bit combinations (or sets of bits), which in turn maps to a beam in the sweep.

Referring back to FIG. 4, in the network node this implies that the identifying S13 comprises determining S13a bit combinations represented by the received symbol sequences and determining S13b a set of bits representing a selected radio link by merging the determined bit combinations. The beam reporting model may define how this merging is done, e.g. one could merge the two sequences according to the order of which they are transmitted and/or received.

An example of the mapping in accordance with the solution (using 16 candidate beams and 2 reporting USS transmissions) is depicted by Table 2-Table 2.

TABLE 2

An example of how sixteen candidate beams can be represented using only 4 unique symbol sequences.

| MRS | 4-bit number | Reporting USSs |
|---|---|---|
| $MRS_3$ | 0000 | $USS_5 + USS_5$ |
| $MRS_4$ | 0001 | $USS_5 + USS_8$ |
| $MRS_5$ | 0010 | $USS_5 + USS_9$ |
| $MRS_7$ | 0011 | $USS_5 + USS_{10}$ |
| $MRS_9$ | 0100 | $USS_8 + USS_5$ |
| $MRS_{13}$ | 0101 | $USS_8 + USS_8$ |
| $MRS_{14}$ | 0110 | $USS_8 + USS_9$ |
| $MRS_{19}$ | 0111 | $USS_8 + USS_{10}$ |
| $MRS_{20}$ | 1000 | $USS_9 + USS_5$ |
| $MRS_{21}$ | 1001 | $USS_9 + USS_8$ |
| $MRS_{24}$ | 1010 | $USS_9 + USS_9$ |
| $MRS_{27}$ | 1011 | $USS_9 + USS_{10}$ |
| $MRS_{29}$ | 1100 | $USS_{10} + USS_5$ |
| $MRS_{30}$ | 1101 | $USS_{10} + USS_8$ |
| $MRS_{31}$ | 1110 | $USS_{10} + USS_9$ |
| $MRS_{32}$ | 1111 | $USS_{10} + USS_{10}$ |

Table 2 illustrates an example of how sixteen candidate beams are used and how the 4 bits required to represent these 16 beams are divided into two subsets of 2 bits each. An example of how the different possible combinations of the 2 bits map to 4 different USS sequences. Note that the 4-bit numbers are just a sequential number series (and hence totally predictable). They do not have to be included in the configuration information transferred to the wireless device, but they are included in the table for explanatory purpose.

In the example 16 candidate beams are included in the beam sweep, hence requiring 4 reporting bits. In the example these 4 bits are divided into two subsets of 2 bits each. Four unique USS sequences are needed to be able to represent any combination of these 2 bits and the mapping between the bit combinations and these 4 USSs is shown in the table 3. These four USS sequences are combined into pairs of reporting USSs (the rightmost column of Table 3).

TABLE 3

An example of how the different possible combinations map to 4 different USS sequences.

| Bit combination | USS |
|---|---|
| 00 | $USS_5$ |
| 01 | $USS_8$ |
| 10 | $USS_9$ |
| 11 | $USS_{10}$ |

Referring back to FIG. 3, this implies that the radio link reporting model comprises information defining how to divide one set of bits representing a selected radio link into two or more bit combinations together identifying a selected radio link. For example MRS3 corresponds to 00+00 or MRS4 to 00+01. The radio link reporting model also comprises a mapping between different bit combinations and respective symbol sequence from a set of constituent symbol sequences. E.g. 00->$USS_5$ and 01->$USS_8$.

Referring back to FIG. 4, this implies that the radio link reporting model comprises information defining a mapping between the symbol sequences and a respective bit combinations (e.g. $USS_5$ 00->00 and $USS_8$ ->01) and information defining how to merge two or more of the bit combinations together identifying the selected radio link into one set of bits representing the selected radio link (e.g. 00+01->MRS4).

Hence, only 4 unique USS sequences are required to be able to report any of the 16 beams in the example of Table 2-Table 2, where the solution is applied, to be compared with the 16 unique USS sequences required to be able to report any of the beams in the prior art example of Table 1.

The number of USS transmissions per reporting message may be adaptive depending on the size of candidate beam set in the current measurement session.

In one embodiment, the division into subsets of bits is based on grouping adjacent, or partly overlapping, beams into groups and dedicate one subset of bits for reporting the beam group and a second set of bits for reporting a beam within a group (e.g. the "intra-group order number" of the beam).

Further aspects of the proposed technique will now be described using USS sequences for reporting one selected beam in a beam sweep for illustration purposes. Note that these aspects are also not limited thereto.

Repetition to Increase USS Report Quality

The network can choose to configure a beam sweep to be repeated one or more times in order to ensure better quality of both the beam measurements and the beam measurement reporting (through USS transmissions). The network may configure the beam sweep repetitions in advance or after a poor quality USS detection (e.g. with low SNR, causing high risk of incorrect decoding) after a sweep. When repeated beam sweeps (and beam sweep measurements and reporting) are used, the concept of beam groups and unequal protection in combination with reception of multiple USS reports may be leveraged to improve beam identification over multiple reports. If a USS report is detected with good quality, the network can use it. Otherwise the network can take all the received USS reports into account. For instance, if a majority of the reports indicate the same wide beam (formed by a beam group), then the access node can decide to disregard the deviating reports and choose to use the indicated wide beam. Furthermore, a quality measure can be associated with each detected USS. This quality measure can be expressed as a SNR (Signal to Noise Ratio), probability of correct detection, log likelihood or a similar measure. If the quality measure is particularly low for a report of a wide beam (i.e. a beam group), then the receiving access node can disregard this report, and instead rely on the wide beam (i.e. beam group) indications of other reports received with higher quality measures.

Another way to handle the situation with a poor quality detection of a USS report could be to introduce a mechanism for acknowledging the USS report, e.g. that the access node transmits an uplink grant in response to successful reception of the USS report (i.e. the one or more USS transmission(s) constituting the USS report). Too poor detection of a USS would then trigger the receiving access node to refrain from transmitting the acknowledgement or transmit an explicit negative acknowledgement.

Accumulating and Utilizing Statistics on Coarse Beam Direction

If the access node receiving the USS transmissions can infer a rough estimate of the transmitting wireless device's location, e.g. based on the source access node (i.e. assuming that handovers from a certain source access node always occur in roughly the same location) or the direction of arrival of the USS transmissions or both, then (assuming beam group reporting and unequal protection) the access node may leverage the wide beam indication (i.e. the reported group of beams which together form a wide beam) from several different wireless devices accumulated over time. The access node would accumulate statistics on the USS reports from wireless devices in roughly the same location and will (assumedly) in many cases conclude that the same wide beam is almost always indicated, even if the narrow beam indications differ.

Then, for subsequent USS reports from wireless devices in the same rough location (e.g. being handed over from the same source access node), if the quality of the USS detection is deemed low, then instead of trusting the USS detection the access node assumes that the usual wide beam (according to the accumulated statistics) will be good enough and starts with that beam.

Adapting the Number of USS Transmissions Based on the Number of Candidate Beams

According to some aspects, the number of USS transmissions may be adaptive depending on the size of the candidate beam set, e.g. the more candidate beams the more USS transmissions may be used to convey the reporting bits. In the measurement command, the wireless device may be configured to use a certain number of transmissions, or the wireless device may determine the required number of transmissions based on the candidate beam set size. In the latter case the determination has to be based on a predefined/preconfigured rule which is known both by the network and the wireless device, so that the network knows how many USS transmissions to expect.

If the network anyway dynamically configures the wireless device with the mapping between USS and reporting bit combinations, then the number of USS transmissions will implicitly be indicated in the configuration of this mapping and the network will know what to expect from the wireless device. But this mapping could also be predefined and static, configured in system information or standardized as a set of USS to bit combination mappings covering as many mappings as is needed for the most extreme case, i.e. the largest number of USS transmissions that the system allows for a USS report. Out of this set of mappings the wireless device would choose to use the mappings that it needs for the number of beams in the sweep and the number of USS transmissions that it has determined to use. For instance, if the standardized/preconfigured static USS to bit combination mappings assumes that a USS can represent maximally 5 bits, there would be 32 ($2^5$) defined mappings covering the bit combination (i.e. binary value) range 0-31 (00000-11111). Then, if the wireless device is to measure on a beam sweep consisting of 16 beams and determines, using a preconfigured/predefined rule, that it should use two USS transmission for the report, then the 4 bits needed to indicate one out of 16 beams are divided into 2 subsets of 2 bits each. For this case the wireless device only needs the 4 first of the predefined mappings covering the 2-bit range 0-3 (00-11). Unless the wireless device's choice of number of USS transmissions follows a rule known also by the network, the network would not know how many USS transmissions to expect. Without such a rule the receiving access node would have allocate redundant USS transmission (and reception) resources (anticipating the maximum number of USS transmissions). In addition, the receiving access node would not be able to leverage knowledge of the exact set of USSs that the wireless device may transmit (e.g. the first four in the predefined mapping table in this example) and may thus have to try redundant decoding hypotheses.

Another factor that, depending on scenario and implementation, may affect the USS reporting format is that it should be unambiguous to the network which wireless device that transmitted a received USS. In some implementations and scenarios, the USS additionally needs to encode the reporting wireless device identity for this purpose. Then the total number of bits represented by the two or more USS transmissions is used to convey the wireless device and beam identities. That total number of bits may be divided evenly over the USS sequences, or uneven partitioning may be used to provide a desired degree of protection to different parts of the message.

Per Sweep or Per Access Node Application of the Solution

All the above described methods/embodiments may be applied per candidate access node or for the entire beam sweep. The former could be seen as dividing the beam sweep into smaller beam sweeps, one for each candidate access node.

Inter-access node considerations for reporting bit partitioning and uplink transmission resource allocation.

Assumedly (in a likely deployment scenario) each access node owns its uplink and downlink transmission resources. Therefore, since the reporting bit partitioning to choose may be a tradeoff with uplink transmission resource usage, a candidate access node has to be involved in the reporting bit partitioning configuration and even though it may be a negotiation between the source access node and the candidate access node, the final approval will ultimately be a decision of the candidate access node.

To cope with this in a handover involving multiple candidate access nodes, the source access node may have to choose the least transmission resource demanding reporting bit partitioning (i.e. the one requiring the fewest USS transmissions) that all candidate access nodes can accept.

An inter-access node interface, e.g. an X2-like interface and an evolved version of X2AP, could be used for the inter-access node signaling to determine the reporting bit partitioning and allocation of uplink transmission resources (e.g. time and frequencies) for the USS transmission(s). The configuration would then be transmitted to the wireless device, e.g. using RRC or MAC signaling.

In a scenario involving multiple candidate access nodes a negotiation procedure between the source access node and the candidate access nodes may be needed to determine uplink transmission resources for the USS transmission(s) that are acceptable for all the candidate access nodes. An alternative is that each candidate access node allocates its own uplink transmission resources without negotiation. This will probably result in different resource allocations in different candidate access nodes and therefore the wireless device would have to be configured to know which uplink transmission resources to use for reporting of a certain beam. That is, for each candidate access node the wireless device would have to be configured with information mapping the set of Mobility Reference Signals, MRS(s), to be transmitted from the candidate access node and the uplink resources to use to report one of these MRS(s)/beam(s).

Example Node Implementation

Figure 5:
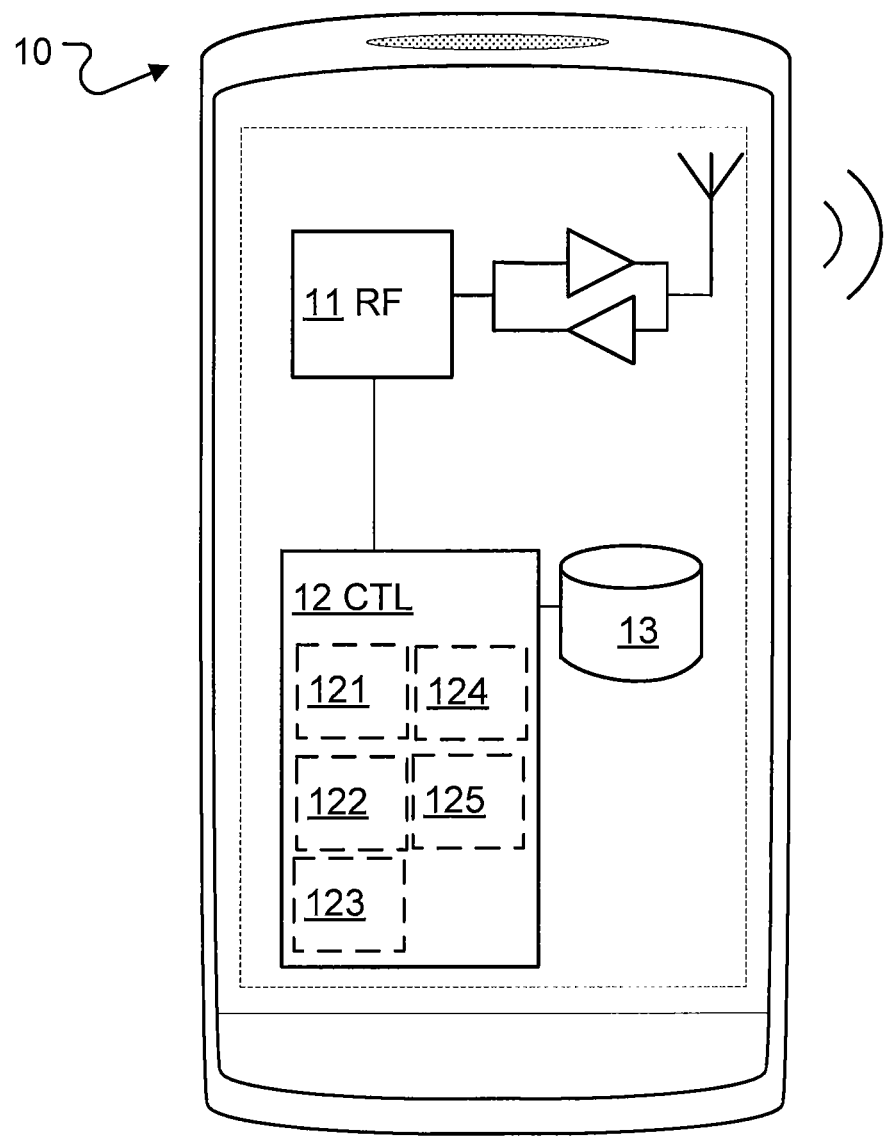
FIG. 5 is an example node configuration of a wireless device, according to some of the example embodiments.

FIG. 5 illustrates an example of a wireless device 10, which incorporates some of the example embodiments discussed above. FIG. 5 discloses a wireless device configured for radio link reporting. The wireless device 10 is configured to implement the methods described in relation to FIG. 3.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or Global Positioning System, GPS, receiver; a Personal Communications System, PCS, user equipment that according to some aspects combine a cellular radiotelephone with data processing; a Personal Digital Assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, etc.

As shown in FIG. 5, the wireless device 10 comprises a radio communication interface or radio circuitry 11 configured to receive and transmit any form of communications or control signals within a network. It should be appreciated that the radio circuitry 11 is according to some aspects comprised as any number of transceiving, receiving, and/or transmitting units or circuitry. It should further be appreciated that the radio circuitry 11 is e.g. be in the form of any input/output communications port known in the art. The radio circuitry 11 e.g. comprises RF circuitry and baseband processing circuitry (not shown).

The wireless device 10 according to some aspects further comprises at least one memory unit or circuitry 13 that is in communication with the radio circuitry 11. The memory 13 is e.g. be configured to store received or transmitted data and/or executable program instructions. The memory 13 is e.g. configured to store any form of radio link reporting model. The memory 13 is e.g. be any suitable type of computer readable memory and is e.g. be of volatile and/or non-volatile type.

The wireless device 10 further comprises processing circuitry 12 which is configured to cause the wireless device to obtain a radio link reporting model, the radio link reporting model defining how to represent one radio link from a plurality of candidate radio links, using two or more symbol sequences from a set of constituent symbol sequences, to determine, based on the radio link reporting model, how to represent a selected radio link, from the plurality of candidate radio links, using two or more of the symbol sequences from the set of constituent symbol sequences, and to transmit the two or more symbol sequences to a network node.

The processing circuitry 12 is e.g. any suitable type of computation unit, e.g. a microprocessor, Digital Signal Processor, DSP, Field Programmable Gate Array, FPGA, or Application Specific. Integrated Circuit, ASIC, or any other form of circuitry. It should be appreciated that the processing circuitry need not be provided as a single unit but is according to some aspects provided as any number of units or circuitry.

The controller, CTL, or processing circuitry 12 is e.g. constituted by any suitable type of computation unit, e.g. a microprocessor, Central Processing Unit, CPU, microcontroller, Digital Signal Processor, DSP, Field Programmable Gate Array, FPGA, or Application Specific Integrated Circuit, ASIC, or any other form of circuitry capable of executing computer program code. The computer program is e.g. stored in a memory, MEM, 13. The memory 13 can be any combination of a Random Access Memory, RAM, and a Read Only Memory, ROM. The memory 13 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a wireless device to execute the methods described above and below.

According to some aspects, the symbol sequences in the set of constituent symbol sequences have been selected such that the correlation between one symbol sequence in the set and any other symbol sequence in the set, is below a threshold.

According to some aspects, the number of symbol sequences in the set of constituent symbol sequences is less than the number of candidate radio links.

According to some aspects, the processing circuitry 12 is configured is to obtain the information by receiving information defining the radio link reporting model from the network node.

According to some aspects, wherein the processing circuitry 12 is configured to obtain the information by reading information defining the radio link reporting model stored in the wireless device.

According to some aspects, wherein the processing circuitry 12 is configured to determine how to represent the radio link by determining two or more symbol sequences, from the set of constituent symbol sequences, to be transmitted.

According to some aspects, the processing circuitry 12 is configured to determine how to represent the radio link by determining time, frequency and/or code resources to be used for the transmission of the two or more symbol sequences.

According to some aspects, the processing circuitry 12 is configured to transmit the two or more symbol sequence separately in time, in frequency, or in the code domain.

According to some aspects, one of the two or more symbol sequences defines a group of candidate radio links and the second an identity of a candidate radio link within the group.

According to some aspects, the processing circuitry 12 is configured to perform measurements on the plurality of candidate radio links, and select from the candidate radio links, based on the performed measurements, at least one by the wireless device preferred radio link for communication with the network.

According to some aspects, the radio link reporting is based on measurements performed on link quality measurement signals transmitted by a network node in the candidate radio links.

According to some aspects, the processing circuitry 12 is configured to divide a set of bits representing the selected radio link into two or more bit combinations together identifying the selected radio link and to map each of the two or more bit combinations, together identifying the selected radio link, to a symbol sequence from a set of constituent symbol sequences.

According to some aspects, the radio link reporting model comprises at least one of information defining how to divide one set of bits representing a selected radio link into two or more bit combinations together identifying a selected radio link and a mapping between different bit combinations and respective symbol sequence from a set of constituent symbol sequences.

According to some aspects the wireless device 10 or the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises an obtainer 121 configured to configured to cause the wireless device to obtain a radio link reporting model, the radio link reporting model defining how to represent one radio link from a plurality of candidate radio links, using two or more symbol sequences from a set of constituent symbol sequences.

According to some aspects the wireless device 10 or the processing circuitry 12 comprises a performer 122 configured to perform measurements on the plurality of candidate radio links.

According to some aspects the wireless device 10 or the processing circuitry 12 comprises a selector 123 configured to select, from the candidate radio links, based on the performed measurements, at least one by the wireless device preferred radio link for communication with the network.

According to some aspects the wireless device 10 or the processing circuitry 12 comprises a determiner 124 configured to determine, based on the radio link reporting model, how to represent a selected radio link, from the plurality of candidate radio links, using two or more of the symbol sequences from the set of constituent symbol sequences.

According to some aspects the wireless device 10 or the processing circuitry 12 comprises a transmitter module 125 configured to transmit the two or more symbol sequences to a network node.

Figure 6:
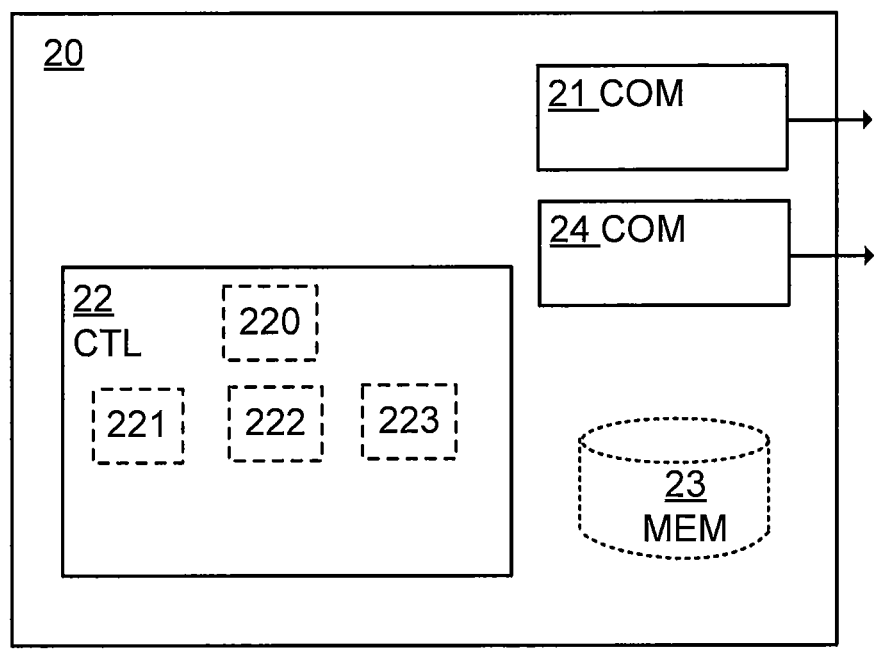
FIG. 6 is an example node configuration of a network node, according to some of the example embodiments.

Turning now to FIG. 6, a schematic diagram illustrating some modules of an example embodiment of a network node in a cellular communication network configured for receiving radio link reporting associated with a plurality of candidate radio links, will now be briefly described. The network node 20 is e.g. an access node such as an eNodeB in LTE.

The network node 20 comprises a radio communication interface (i/f) 21 configured for communication with wireless devices 10. The wireless communication interface 21 is arranged for wireless communication with other network nodes within range of the network node 20. The radio communication interface 21 may be adapted to transmit data from several transmission points that are e.g. wirelessly connected to the network node 20. The radio communication interface 21 may be adapted to communicate over one or several radio access technologies. If several technologies are supported, the node typically comprises several communication interfaces, e.g. one WLAN or Bluetooth communication interface and one cellular communication interface.

As shown in FIG. 6, the network node 20 according to some aspects comprises a network communication interface 24. The network communication interface 24 is configured for communication with other network nodes e.g. in a core network. This communication is often wired e.g. using fiber. However, it may as well be wireless.

The network node 20 comprises a controller, CTL, or a processing circuitry 22 that may be constituted by any suitable Central Processing Unit, CPU, microcontroller, Digital Signal Processor, DSP, etc. capable of executing computer program code. The computer program may be stored in a memory, MEM 23. The memory 23 can be any combination of a Random Access Memory, RAM, and a Read Only Memory, ROM. The memory 23 may also comprise persistent storage, which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program.

The processing circuitry 22 is configured to cause the network node 20 to obtain a radio link reporting model defining how to identify one radio link, from a plurality of candidate radio links, using two or more symbol sequences from a set of constituent symbol sequences, to receive two or more of the symbol sequences from a set of constituent symbol sequences, the two or more symbol sequences together identifying a selected radio link, and to identify the selected radio link based on the received two or more symbol sequences and the obtained radio link reporting model.

According to some aspects, the symbol sequences have been selected such that the correlation between one symbol sequence in the set, and any other symbol sequence in the set, is below a threshold.

According to some aspects, the number of symbol sequences in the set of constituent symbol sequences is less than the number of candidate radio links.

According to some aspects, the processing circuitry 22 is configured to identifying the selected radio link based on which symbol sequences, from the set of constituent symbol sequences, are received.

According to some aspects, the processing circuitry 22 is configured to identifying the selected radio link based on which time, frequency and/or code resources are used for receiving the symbol sequences.

According to some aspects, one of the two or more symbol sequences defines a group of candidate radio links and the second an identity of a candidate radio link within the group.

According to some aspects, the processing circuitry 22 is configured to receive the two or more symbol sequences separately in time, in frequency, or in the code domain.

According to some aspects, the processing circuitry 22 is configured to provide information defining the radio link reporting model to the wireless device According to some aspects, the reporting is based on measurements performed on link quality measurement signals transmitted by a network node in the candidate radio links.

According to some aspects, the processing circuitry 22 is configured to identify the radio link by determining bit combinations represented by the received symbol sequences and determining a set of bits representing a selected radio link by merging the determined bit combinations.

According to some aspects, the radio link reporting model comprises; a mapping between the symbol sequences and a respective bit combination; and information defining how to merge two or more of the bit combinations together identifying the selected radio link into one set of bits representing the selected radio link.

According to some aspects the processing circuitry 22 or the network node 20 comprises modules configured to perform the methods described above. The modules are implemented in hardware or in software or in a combination thereof. The modules are according to one aspect implemented as a computer program stored in a memory 23 which run on the processing circuitry 22.

According to some aspects the network node 20 or the processing circuitry 22 comprises a provider 220 configured to cause the network node to provide information defining the beam reporting model to the wireless device.

According to some aspects the network node 20 or the processing circuitry 22 comprises an obtainer 221 configured to cause the network node to obtain a radio link reporting model defining how to identify one radio link, from a plurality of candidate radio links, using two or more symbol sequences from a set of constituent symbol sequences.

According to some aspects the network node 20 or the processing circuitry 22 comprises a receiver 222 configured to cause the network node to receive two or more of the symbol sequences from a set of constituent symbol sequences, the two or more symbol sequences together identifying a selected radio link.

According to some aspects the network node 20 or the processing circuitry 22 comprises an informer 223 configured to cause the network node to identify the selected radio link based on the received two or more symbol sequences and the obtained radio link reporting model.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for use in a wireless device, for radio link reporting, the method comprising:
   obtaining a radio link reporting model, the radio link reporting model defining how to represent one radio link from a plurality of candidate radio links, using two or more symbol sequences from a set of constituent symbol sequences,
   determining, based on the radio link reporting model, how to represent a selected radio link, from the plurality of candidate radio links, using two or more of the symbol sequences from the set of constituent symbol sequences, and
   transmitting the two or more symbol sequences to a network node,
   wherein the symbol sequences in the set of constituent symbol sequences have been selected such that the correlation between one symbol sequence in the set and any other symbol sequence in the set, is below a threshold.

2. The method of claim 1, wherein the number of symbol sequences in the set of constituent symbol sequences is less than the number of candidate radio links.

3. The method according to claim 1, wherein the obtaining comprises receiving information defining the radio link reporting model from the network node.

4. The method according to claim 1, wherein the obtaining comprises reading information defining the radio link reporting model stored in the wireless device.

5. The method according to claim 1, wherein the determining comprises determining two or more symbol sequences, from the set of constituent symbol sequences, to be transmitted.

6. The method according to claim 1, wherein the determining comprises determining time, frequency and/or code resources to be used for the transmission of the two or more symbol sequences.

7. The method according to claim 1, wherein the transmitting comprises transmitting the two or more symbol sequence separately in time, in frequency, or in the code domain.

8. The method according to claim 1, wherein one of the two or more symbol sequences defines a group of candidate radio links and the second an identity of a candidate radio link within the group.

9. The method according to claim 1, comprising:
   performing measurements on the plurality of candidate radio links, and
   selecting from the candidate radio links, based on the performed measurements, at least one by the wireless device preferred radio link for communication with the network.

10. The method according to claim 1, wherein the radio link reporting is based on measurements performed on link quality measurement signals transmitted by a network node in the candidate radio links.

11. The method of claim 10 comprising:
    dividing a set of bits representing the selected radio link into two or more bit combinations together identifying the selected radio link; and
    mapping each of the two or more bit combinations, together identifying the selected radio link, to a symbol sequence from a set of constituent symbol sequences.

12. The method according to claim 1, wherein the radio link reporting model comprises at least one of:
    information defining how to divide one set of bits representing a selected radio link into two or more bit combinations together identifying a selected radio link; and
    a mapping between different bit combinations and respective symbol sequence from a set of constituent symbol sequences.

13. A method for use in a network node, for receiving radio link reporting associated with a plurality of candidate radio links, the method comprising:
    obtaining a radio link reporting model defining how to identify one radio link, from a plurality of candidate radio links, using two or more symbol sequences from a set of constituent symbol sequences,
    receiving two or more of the symbol sequences from a set of constituent symbol sequences, the two or more symbol sequences together identifying a selected radio link, and
    identifying the selected radio link based on the received two or more symbol sequences and the obtained radio link reporting model,
    wherein the symbol sequences in the set of constituent symbol sequences have been selected such that the correlation between one symbol sequence in the set and any other symbol sequence in the set, is below a threshold.

14. The method of claim 13, wherein the number of symbol sequences in the set of constituent symbol sequences is less than the number of candidate radio links.

15. The method according to claim 13, wherein the identifying comprises identifying the selected radio link based on which symbol sequences, from the set of constituent symbol sequences, are received.

16. The method according to claim 13, wherein the identifying comprises identifying the selected radio link based on which time, frequency and/or code resources are used for receiving the symbol sequences.

17. The method according to claim 13, wherein one of the two or more symbol sequences defines a group of candidate radio links and the second an identity of a candidate radio link within the group.

18. The method according to claim 13, wherein receiving comprises receiving the two or more symbol sequences separately in time, in frequency, or in the code domain.

19. The method according to claim 13, comprising:
providing information defining the radio link reporting model to the wireless device.

20. The method according to claim 13, wherein the reporting is based on measurements performed on link quality measurement signals transmitted by a network node in the candidate radio links.

21. The method according to claim 13, wherein the identifying comprises:
determining bit combinations represented by the received symbol sequences; and
determining a set of bits representing a selected radio link by merging the determined bit combinations.

22. The method according to claim 13, wherein the radio link reporting model comprises:
a mapping between the symbol sequences and a respective bit combination; and
information defining how to merge two or more of the bit combinations together identifying the selected radio link into one set of bits representing the selected radio link.

23. A wireless device being configured for radio link reporting, the wireless device comprising:
circuitry communication interface; and
processing circuitry configured to cause the wireless device:
to obtain a radio link reporting model, the radio link reporting model defining how to represent one radio link from a plurality of candidate radio links, using two or more symbol sequences from a set of constituent symbol sequences,
to determine, based on the radio link reporting model, how to represent a selected radio link, from the plurality of candidate radio links, using two or more of the symbol sequences from the set of constituent symbol sequences, and
to transmit the two or more symbol sequences to a network node,
wherein the symbol sequences in the set of constituent symbol sequences have been selected such that the correlation between one symbol sequence in the set and any other symbol sequence in the set, is below a threshold.

24. A network node in a cellular communication network configured for receiving radio link reporting associated with a plurality of candidate radio links, the network node, comprising:
a communication interface; and
processing circuitry configured to cause the network node:
to obtain a radio link reporting model defining how to identify one radio link, from a plurality of candidate radio links, using two or more symbol sequences from a set of constituent symbol sequences,
to receive two or more of the symbol sequences from a set of constituent symbol sequences, the two or more symbol sequences together identifying a selected radio link, and
to identify the selected radio link based on the received two or more symbol sequences and the obtained radio link reporting model,
wherein the symbol sequences in the set of constituent symbol sequences have been selected such that the correlation between one symbol sequence in the set and any other symbol sequence in the set, is below a threshold.

* * * * *